Feb. 21, 1933.  E. J. McEACHRON ET AL  1,898,377

BATTERY CONSTRUCTION

Filed July 29, 1927   2 Sheets-Sheet 1

Witness:
R. Burkhardt.

Inventors:
Edgar J. McEachron,
Reginal S. Johnson,
By Wilkinson, Huxley, Byron & Knight
Attys.

Feb. 21, 1933. E. J. McEACHRON ET AL 1,898,377
BATTERY CONSTRUCTION
Filed July 29, 1927 2 Sheets-Sheet 2
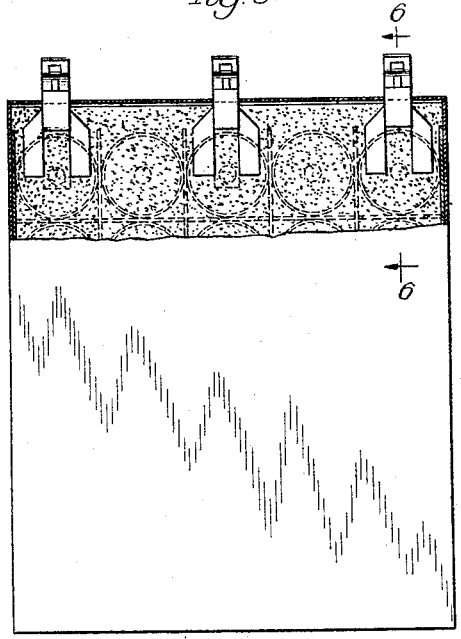
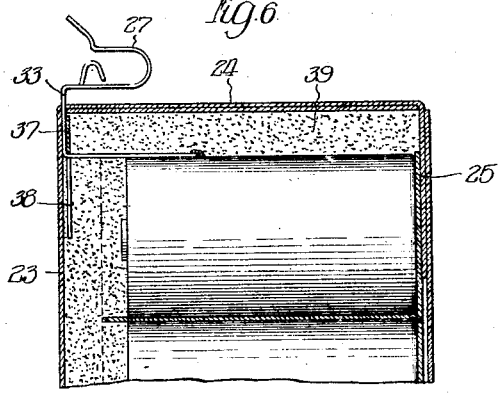
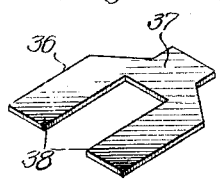
Inventors:
Edgar J. McEachron,
Reginal S. Johnson,
By Wilkinson, Huxley, Byron v Knight
Attys.
Witness:
R. Burkhardt Patented Feb. 21, 1933

1,898,377

UNITED STATES PATENT OFFICE

EDGAR J. McEACHRON AND REGINALD S. JOHNSON, OF WAUSAU, WISCONSIN, ASSIGNORS TO MARATHON BATTERY COMPANY, OF WAUSAU, WISCONSIN, A CORPORATION OF WISCONSIN

BATTERY CONSTRUCTION

Application filed July 29, 1927. Serial No. 209,234.

This invention relates to a new and improved battery construction and more particularly to a construction of multiple cell batteries in which the cells are located horizontally in a casing.

It has been customary heretofore to make up multiple cell batteries by placing the cells vertically in a casing provided with an egg crate structure to separate the cells and maintain them in proper relation. After the cells are electrically connected the top of the battery assembly is sealed with a pitchy sealing material. Due to a desire to produce a battery which will take up less table or floor space it has become the practice to turn these battery assemblies on edge and provide them with terminals extending from the upper face. In this position the cells are horizontal, and it has been customary to provide a second seal of pitchy material on the upper face of the assembly overlying the topmost row of horizontally extending cells.

It is an object of the present invention to provide a new and improved method of assembling what is known as a vertical type battery and to provide a new and improved battery construction.

It is a further object to provide a method of assembly and battery which utilizes an outer carton or case which may be of the collapsible type and which is less expensive than the solid, rigid outer casing as now generally used.

It is an additional object to provide a construction in which the top of the battery as assembled may be closed without the necessity of a second pitchy seal or the like.

It is a further object to provide a method of assembly whereby the terminals may be inserted through the upper portion of the enclosing casing and secured to the cells in the casing without large perforations or openings in the upper casing wall.

Other and further objects will appear as the description proceeds.

We have illustrated in the accompanying drawings certain preferred embodiments of our invention, in which Figure 1 is a face view of one form of construction partly broken away to show the interior structure;

Figure 5 is a view similar to Figure 1, showing a modified form of construction;

Figure 6 is a section taken on line 6—6 of Figure 5; and

Figure 7 is a perspective view of a protective member.

The present case is restricted to the process herein disclosed, as claims directed to the battery as an article of manufacture are included in applicant's co-pending application Serial No. 591,000, filed February 5th, 1932, which is a division of this application.

Figure 1:
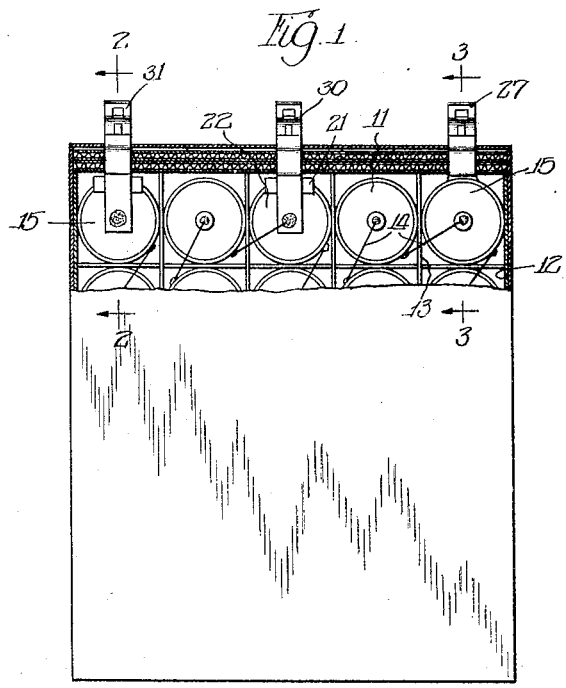
Figure 2:
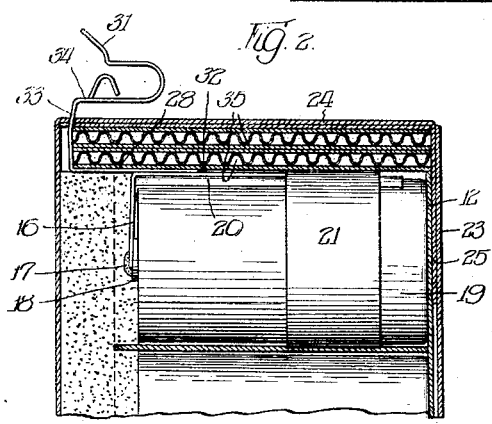
Figure 2 is a fragmentary section taken on line 2—2 of Figure 1.
Figure 3:
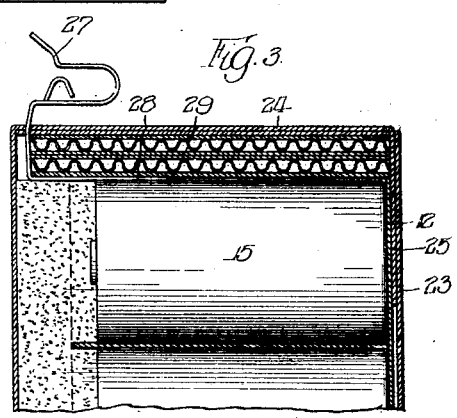
Figure 3 is a similar section taken on line 3—3 of Figure 1.

Referring particularly to Figures 1 to 3, the battery comprises a plurality of cells 11 which are placed in an inner casing 12 and separated and held in position by an egg crate structure 13. The cells 11 are electrically connected by means of wires 14. It will be understood that in the normal assembly the inner casing 12 will be placed horizontally and the cells slipped into place extending vertically. One of the end cells 15 is provided with a member 16, as best shown in Figure 2, this member preferably consisting of a brass strip which is soldered at 17 to a cap 18 secured to the end of the carbon pencil located in the cell. The strip 16 extends up and along the side of the cell and is insulated therefrom by a strip 20 of any insulating material such, for example, as waxed pasteboard or the like. The end of the strip 16 is held down by means of a wrapping 21 of electrician's tape or similar material which also serves to retain in place the insulating material 20. If more than two terminals are to be provided for the finished battery, additional cells such as 22 of Figure 1, may be equipped similarly to cell 15. These cells are provided in this manner before they are inserted in the inner casing. No terminals are secured to the cells or to the strip 16 at this time in the preferred method of assembly.

Figure 4:
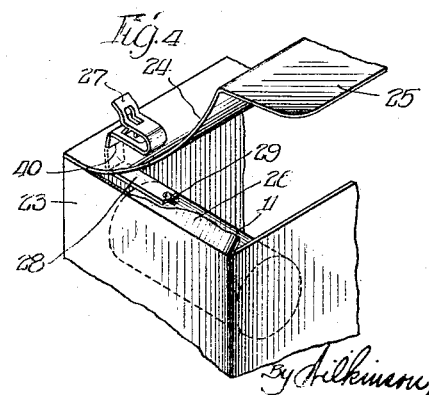
Figure 4 is a fragmentary perspective showing a step in the assembly.

The upper portion of the assembly is next filled with the usual seal of pitchy material. The outer casing which preferably is in the form of a collapsible carton, is next assembled and opened to receive the inner casing. Its lower end may be permanently closed by gluing the flap in place. The upper end is left open. The upper side of the inner casing, which is the side adjacent the cells 15 and 22, is now broken away and removed. The inner casing is then slipped into the outer casing and assumes the position shown in the drawings. Figure 4 shows the outer casing 23 provided with the cover portion 24 having the flap 25 and also provided with end flaps 26. The end flap 26 in Figure 4 has been broken away in order to show the method of assembly.

The cover portion 24 is provided with narrow slits 40 and through such slit the spring terminal 27 has its lower portion inserted. Its horizontal portion 28 is placed in contact with the cell 11 and is soldered to the cell as shown at 29. In a similar manner the terminals 30 and 31 are inserted through slits in the cover portion and are soldered at 32 to the strips 16, as shown in Figure 2.

As shown in Figures 2 and 3, the terminals are provided with the lower horizontal portions 28, with the intermediate substantially vertical portions 33 and with upper horizontal portions 34. After the terminals have been secured in place the upper portion of the outer casing may be closed by placing therein one or more strips of corrugated board 35 or other similar material. The flap 25 is then slipped down between the inner casing 12 and the outer carton 23, and secured in place by a suitable adhesive. This serves to complete the assembly of the battery.

The form of assembly shown in Figures 5 and 6 differs from that of Figures 1 to 3 solely in the filling of the upper portion of the outer casing. After the terminals have been inserted through the cover and secured to the cells or strip 16, the protecting members 36, which may be formed of waxed cardboard, are slipped in place over each terminal. These members 36 are provided with portions 37 which extend adjacent the vertical portions 33 of the terminal and the legs 38 which fit down upon either side of the terminal, and thus maintain the members 36 in position. The upper portion of the outer casing 23 is then filled with a pitchy seal 39 similar to that placed in the inner casing before the assembly of the inner casing in the outer casing. The members 36 prevent the terminals from adhering to the seal and the terminals do not pass through the seal but around an edge thereof between the outer casing and the protecting members 36. The top portion 24 of the outer casing is then bent down and the flap 25 inserted and sealed in place in the same manner as previously described. This form of construction is slightly more expensive than the form in which the upper portion is merely filled with the corrugated board or similar material.

It will be noted that in both of these forms of construction by our preferred method of assembly the terminals are inserted through narrow slits in the cover and therefore no portions of the contents of the carton are visible. If the terminals were secured before the cell assembly was placed in the outer carton, it would be necessary to have comparatively large openings in the cover for the terminals to pass through and in this case it would be practically necessary to use the pitchy seal construction of Figures 5 and 6 in all cases. This method of assembly reduces assembly costs and enables collapsible cartons, which may be cheaply made of relatively light material, to be used. The invention therefore very materially reduces the cost of producing batteries of this type and affords a highly efficient construction.

While we have shown certain preferred forms of construction, it is to be understood that we contemplate such changes and modifications as come within the spirit and scope of the appended claims.

We claim:

1. The method of producing a battery which comprises providing an open top inner casing, inserting a plurality of cells in said inner casing and connecting the poles thereof, covering the exposed ends of said cells with a suitable sealing material, and subsequently removing at least a portion of one wall of said inner casing to expose a portion of one of said cells for providing a terminal contact for said battery, inserting said inner casing in an outer casing in such manner that said cells are horizontal and said exposed portion of one of said cells is uppermost, securing a terminal to said exposed portion and finally closing the upper side of said outer casing.

2. A method of battery assembly which comprises inserting a plurality of cells in an open top inner case, making electrical connection between said cells and sealing the exposed ends of said cells, removing at least a portion of a lateral wall of the inner case, inserting the inner case in an outer case in such manner that the cells are horizontal and said lateral wall of the inner case is uppermost, the outer case having an integral member adapted to close its upper side, extending the lower portions of terminals through said member from the upper side, securing said terminals to certain of the cells, and closing said member down to cover the upper side of the casing.

3. A method of battery assembly which comprises inserting a plurality of cells in an inner supporting construction having at least a portion of one wall open, making electrical connection between said cells, inserting the inner construction in an outer case in such manner that the cells are horizontal and the open wall of the inner construction is uppermost, the outer case having an integral member adapted to close its upper side, extending the lower portions of terminals through said member from the upper side, securing said terminals to certain of the cells, and closing said member down to cover the upper side of the casing.

4. A method of battery assembly which comprises inserting a plurality of cells in an inner supporting construction having at least a portion of one wall open, making electrical connection between said cells, inserting the inner construction in an outer case in such manner that the cells are horizontal and the open wall of the inner construction is uppermost, the outer case having an integral member adapted to close its upper side, extending the lower portions of terminals through said member from the upper side, securing said terminals to certain of the cells, placing a filling material in the upper portion of the outer casing, and closing said member down to cover the upper side of the casing.

5. The method of producing a battery having a plurality of connected cells, which comprises providing an open top casing having a plurality of cell compartments, mounting cells of slightly less height than said casing in each compartment and connecting the poles thereof, then covering the exposed ends of said cells with a suitable sealing material by employing the projecting walls of said casing to mold the formation thereof, and subsequently removing at least a portion of one wall of said casing to expose portions of certain of said cells for providing terminal contacts for said battery.

6. The method of producing a battery having a plurality of connected cells, which comprises mounting a plurality of cells in an inner casing and connecting the poles thereof, providing a connection from the positive pole of one of said cells and binding the same against the body of said cell but insulated therefrom, then providing a relatively flexible one-piece outer casing having slits in the cover for accommodating connecting terminals, mounting terminals through said slits, and placing said inner casing in said outer casing, soldering said terminals to the negative cell casing and the positive connection respectively and subsequently closing said cover.

7. The method of producing a battery having a plurality of connected cells which comprises providing an open top casing having a plurality of cell compartments, providing at least one cell for connection to a positive terminal having a conductor connected at one end to the positive pole of said cell with the remaining portion thereof insulated from and mechanically bound in engagement with the body of said cell, mounting a plurality of cells including the cell above provided, all of slightly less height than the walls of said casing in said compartments with the latter cell adjacent a wall of said casing, covering the exposed ends of said cells with a suitable sealing material while employing the projecting walls of said casing as a confining mold therefor, and subsequently removing at least a portion of said wall to expose a portion of the zinc can of one of said cells for making a negative connection thereto and said conductor for making the positive connection.

8. The method of producing a battery having a plurality of connected cells which comprises providing an open top casing having a plurality of cell compartments, providing at least one cell for connection to a positive terminal having a conductor connected at one end to the positive pole of said cell with the remaining portion thereof insulated from and mechanically bound in engagement with the body of said cell, mounting a plurality of cells including the cell above provided, all of slightly less height than the walls of said casing in said compartments with the latter cell adjacent a wall of said casing, covering the exposed ends of said cells with a suitable sealing material while employing the projecting walls of said casing as a confining mold therefor, and subsequently removing at least a portion of said wall to expose a portion of the zinc can of one of said cells for making a negative connection thereto and said conductor for making the positive connection, then placing the assembly so provided in an outer casing having openings therethrough for accommodating terminals, inserting terminals through said openings and connecting said terminals to said zinc can and conductor respectively.

9. The method of producing a battery having a plurality of connected cells which comprises providing an open top casing having a plurality of cell compartments, providing at least one cell for connection to a positive terminal having a conductor connected at one end to the positive pole of said cell with the remaining portion thereof insulated from and mechanically bound in engagement with the body of said cell, mounting a plurality of cells including the cell above provided, all of slightly less heighth than the walls of said casing in said compartments with the latter cell adjacent a wall of said casing, covering the exposed ends of said cells with a suitable sealing material while employing the projecting walls of said casing as a confining mold therefore, and subsequently removing at least a portion of said wall to expose a portion of the zinc can of one of said cells for making a negative connection thereto and said conductor for making the positive connection, then placing the assembly so provided in a collapsible one-piece carton adapted to form a housing on all sides thereof, and having openings through one wall for accommodating terminals, inserting terminals through said openings and connecting said terminals through said zinc can and conductor respectively.

10. The method of producing a battery having a plurality of connected cells which comprises providing an open top casing having a plurality of cell compartments, providing at least one cell for connection to a positive terminal having a conductor connected at one end to the positive pole of said cell with the remaining portion thereof insulated from and mechanically bound in engagement with the body of said cell mounting a plurality of cells including the cell above provided, all of slightly less heighth than the walls of said casing in said compartments with the latter cell adjacent a wall of said casing, covering the exposed ends of said cells with a suitable sealing material while employing the projecting walls of said casing as a confining mold therefor, and subsequently removing at least a portion of said wall to expose a portion of the zinc can of one of said cells for making a negative connection thereto and said conductor for making the positive connection, then placing the assembly so provided in a collapsible one-piece carton adapted to form a housing on all sides thereof, and having openings through one wall for accommodating terminals, inserting terminals through said openings and connecting said terminals through said zinc can and conductor respectively, and finally closing said carton.

Signed at Wausau, Wisconsin, this 27th day of July, 1927.

EDGAR J. McEACHRON.
REGINALD S. JOHNSON.